(12) United States Patent
Glad

(10) Patent No.: US 11,163,413 B2
(45) Date of Patent: Nov. 2, 2021

(54) CAPACITIVE SENSOR FOR A THREE DIMENSIONAL OBJECT

(71) Applicant: Cirque Corporation, Sandy, UT (US)

(72) Inventor: Paul Glad, Sandy, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 16/902,862

(22) Filed: Jun. 16, 2020

(65) Prior Publication Data

US 2020/0310596 A1 Oct. 1, 2020

Related U.S. Application Data

(63) Continuation-in-part of application No. 15/982,429, filed on May 17, 2018, now Pat. No. 10,719,179.

(51) Int. Cl.
*G06F 3/044* (2006.01)

(52) U.S. Cl.
CPC .......... *G06F 3/0448* (2019.05); *G06F 3/0446* (2019.05); *G06F 2203/04107* (2013.01)

(58) Field of Classification Search
CPC ................ G06F 3/0448; G06F 3/0446; G06F 2203/04107; G06F 2203/04103; G06F 3/0445

See application file for complete search history.

(56) References Cited

U.S. PATENT DOCUMENTS

| 9,465,490 B2 | 10/2016 | Hinson | |
|---|---|---|---|
| 2015/0077350 A1* | 3/2015 | Hinson | G06F 3/0445 345/173 |
| 2015/0309531 A1* | 10/2015 | Tanemura | G06F 3/04164 345/174 |

* cited by examiner

*Primary Examiner* — Mark W Regn

(57) ABSTRACT

A touch sensor may include a substrate material, a continuous electrode arranged along a dimension of the substrate material, a segmented electrode transversely arranged with respect to the continuous electrode and wherein the segmented electrode is divided into multiple segments that are spaced apart at a distance from each other, and at least one trace that electrically connects the multiple segments.

19 Claims, 16 Drawing Sheets

CAPACITIVE SENSOR FOR A THREE DIMENSIONAL OBJECT

CROSS REFERENCE TO RELATED APPLICATIONS

This application is a continuation-in-part of U.S. patent application Ser. No. 15/982,429 filed on May 17, 2018 and titled Capacitive Sensor Enabling Row and Column Node Alignment when Disposed on a Three-Dimensional Object. U.S. patent application Ser. No. 15/982,429 is incorporated by reference for all that it discloses.

BACKGROUND

This disclosure relates generally to touch and proximity sensors. More specifically, the disclosure relates to a system and method for manufacturing a planar capacitive sensor that when disposed over a three-dimensional object such as a multi-axis surface, a single axis surface, a hemispherical object or a globular object, the rows and columns will align sufficient to enable detection and tracking of objects without modification of the algorithms used if the object were planar.

There are several designs for touch sensors which may be used. It is useful to examine the underlying technology of the touch sensors to better understand how any capacitance sensitive touchpad may take advantage of the principles in the present disclosure.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. At least some of the position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is used to determine the position of a finger on or in proximity to a touchpad 10 as follows. This example describes row electrodes 12 and is repeated in the same manner for the column electrodes 14. The values obtained from the row and column electrode measurements determine an intersection which is the centroid of the pointing object on or in proximity to the touchpad 10.

A first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven.

In other words, the electrode on one side of the group is added, while the electrode on the opposite side of the group is no longer driven. The new group is then driven by the P, N (positive-negative) generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the principles disclosed in the present disclosure. The process above is repeated for the Y or column electrodes 14 using a P, N generator 24.

Although the CIRQUE® touch sensor described above uses a grid of X and Y electrodes 12, 14 and a separate and single sense electrode 16, the sense electrode may also be the X or Y electrodes 12, 14 by using multiplexing.

It is difficult to create a capacitive sensor that is easily disposed over three dimensional objects such as a hemisphere or a globe. One reason may be that it is difficult to find a shape that can be manufactured in a planar design, but then folded and still function as a touch sensor when disposed over a three-dimensional shape.

A second reason may be that the software that executes algorithms that determine if objects are present on a touch sensor is typically a proprietary construction that will only function for the specific touch sensor.

Accordingly, it would be an advantage over conventional technology to provide a planar shape for a capacitive touch sensor that may be manufactured in a planar profile and use software for detection and tracking of objects that does not require substantial modification from existing rectangular touch sensor configuration.

SUMMARY

In one embodiment, a touch sensor may include a substrate material, a continuous electrode arranged along a dimension of the substrate material, a segmented electrode transversely arranged with respect to the continuous electrode and wherein the segmented electrode is divided into multiple segments that are spaced apart at a distance from each other, and at least one trace that electrically connects the multiple segments.

A portion of at least one trace may be located on a shielded layer of the touch sensor that is electrically shielded from the layers containing the continuous electrode and segmented electrode.

The substrate material may include multiple branches extending outwardly from a continuous section of the substrate material and at least one gap is formed between the branches when the substrate material is flat.

The touch sensor may include a three dimensional touch surface where the substrate material is bent to conform with a profile of the back surface of the touch surface and position up against the profile.

The three dimensional surface may be a multi-axis surface.

The branches may come together when the substrate material is bent to conform with the profile and reduce the distance between the segments of the segmented electrode.

The segments of the segmented electrode may be deposited on a different branch.

The segments of the segmented electrode may be arranged in a line and form a column of a capacitance measuring grid when the touch sensor is bent match and be secured against a curved surface.

The continuous electrode may form a row in the capacitance measuring grid.

The curved surface may be part of a gaming controller.

The touch sensor may include a shield where the shield includes at least one opening through which the trace is routed to connect the multiple segments.

The trace may be deposited on a portion of the branch and the continuous section.

The continuous electrode may be deposited on a first branch connected on a first side of the continuous section and on a second branch connected on a second side of the continuous section, wherein the continuous electrode spans across the continuous to the first branch and the second branch.

The trace may have a serpentine route between the branches and the continuous portion and also crosses back and forth between an electrode layer of the touch sensor and a shielded layer of the touch sensor.

In one embodiment, a touch sensor may include a substrate material, a shape of the substrate material including a continuous section and multiple branches, a continuous electrode arranged along a length of at least one of the branches, a segmented electrode transversely arranged with respect to the length of the branches and arranged to cross over at least one gap formed between the branches of the substrate material causing the segmented electrode to be divided into multiple segments across multiple branches that are spaced apart at a distance from each other by the gap, and at least one trace that electrically connects the multiple segments and that is routed through both the continuous section and the branches.

A portion of the trace may be located on a shielded layer of the touch sensor that is electrically shielded from the layers containing the continuous electrode and segmented electrode.

The touch sensor may include a three dimensional touch surface where the substrate material is bent to conform with a profile of the back surface of the touch surface and position up against the profile.

The three dimensional surface may be a multi-axis surface.

The branches may come together when the substrate material is bent to conform with the profile and reduce the distance between the segments of the segmented electrode.

In one embodiment, a touch sensor may include a substrate material, a shape of the substrate material including a continuous section and multiple branches, a continuous electrode arranged along a length of at least one of the branches, a segmented electrode transversely arranged with respect to the length of the branches causing the segmented electrode to be divided into multiple segments across multiple branches, and at least one trace that electrically connects the multiple segments and that is routed through both the continuous section and the branches.

BRIEF DESCRIPTION OF THE DRAWINGS

A further understanding of the nature and advantages of the present disclosure may be realized by reference to the following drawings. In the appended figures, similar components or features may have the same reference label.

DETAILED DESCRIPTION OF THE INVENTION

Figure 1:
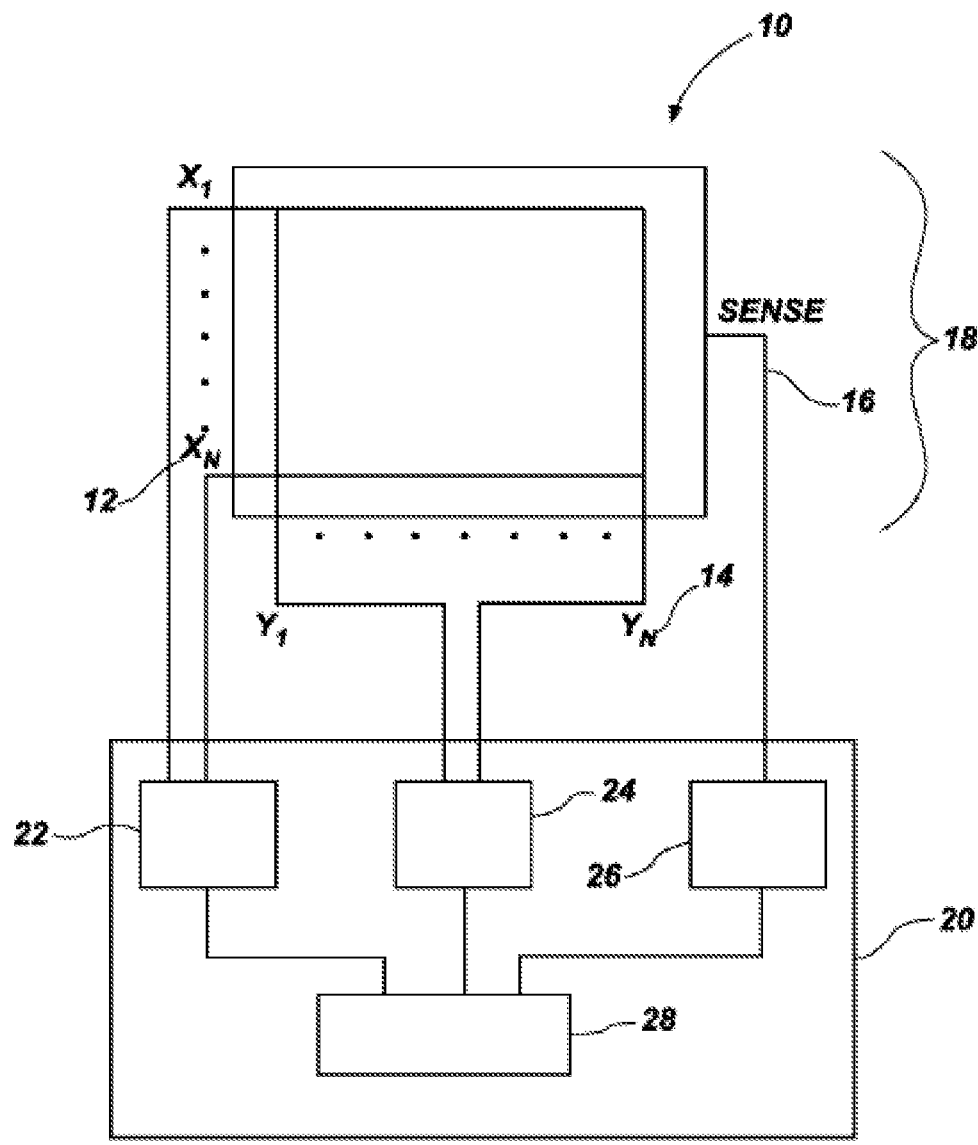
FIG. 1 depicts an example of a prior art touch sensor that may function in the present disclosure.

This description provides examples, and is not intended to limit the scope, applicability or configuration of the invention. Rather, the ensuing description will provide those skilled in the art with an enabling description for implementing embodiments of the present disclosure. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" generally refers to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, and the term "Rx" generally refers to a sense line.

It should be understood that use of the terms "touch pad" and "touch sensor" throughout this document may be used interchangeably with "capacitive touch sensor," "capacitive sensor," "capacitive touch and proximity sensor," "proximity sensor," "touch and proximity sensor," "touch panel," "touchpad," and "touch screen." Further, for the purposes of this disclosure, the term "proximity controller" or "touch controller" is a logic device capable of receiving electrical measurements to determine changes in capacitance. In some cases, the proximity controller may determine a distance the object is away from the key position or another location.

The first embodiment of the present disclosure is both a system and method for providing a planar capacitive touch sensor that may be folded over a three-dimensional object so as to conform to the shape of the three-dimensional object. Such non-planar touch sensor configurations typically involve a unique set of algorithms for detecting and tracking objects thereon because there may be no alignment of capacitive measurement nodes in columns and rows.

However, the first embodiment of the present invention is a configuration for a planar touch sensor such that when the planar touch sensor is disposed over the three-dimensional shape, the columns and rows of the touch sensor respond as if they are substantially linear. This substantial linearity may be defined as enabling touch sensor algorithms that are used for planar rectangular touch sensors may also be used without substantial modification for the three dimensional configuration of the touch sensor.

Figure 2A:
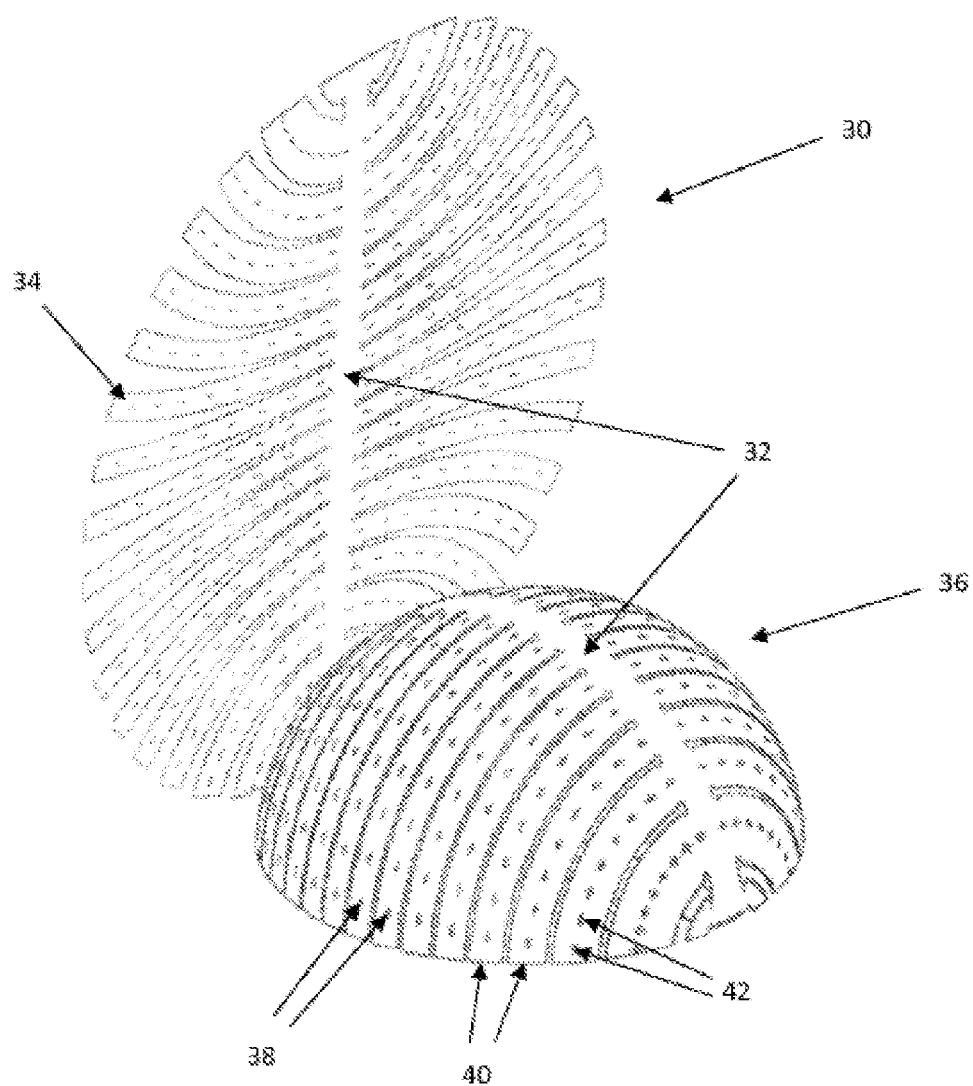
FIG. 2A depicts an example of two views of a first embodiment of the present disclosure.

FIG. 2A is a perspective view of a first embodiment of the disclosure. Two images are shown of the same touch sensor in FIG. 2. The first image is a planar touch sensor 30 that is manufactured on a planar substrate. The second image is the planar touch sensor after it is disposed on a three-dimensional hemispherical object (not shown) to thereby form a shaped touch sensor 36 after it has been cut from the planar substrate and disposed over a three-dimensional object. In this case, the three-dimensional object is a hemispherical shape.

It should be understood that when the planar touch sensor 30 is cut from a planar substrate, the cut is made along the outline of the touch sensor. In addition, the substrate may be a flexible material such as MYLAR™ or Polyethylene terephthalate (PET) as known to those skilled in the art. The material used for the substrate may be capable of flexing such it may conform to the curvature of a three dimensional object without leaving gaps or making creases in the substrate material.

The planar and shaped touch sensors 30, 36 may include a central spine 32 and a plurality of touch sensor branches 34. One feature of the planar touch sensor 30 is that the touch sensor branches 34 are seen having a curved shape when shown in the planar configuration. The curvature of the touch sensor branches 34 may be shaped for the touch sensor 36 to have the proper spacing between the touch sensor branches 34. It is noted that the spacing between the touch sensor branches 34 changes and the spacing is wider the further the touch sensor branches are from the central spine 32.

However, when the planar touch sensor 30 is bent so as to conform to the surface of the three dimensional object, the spacing between the touch sensor branches 34 is changed. The shaped touch sensor 36 shows even spacing between the touch sensor branches 34 when disposed around a curved portion of the hemispherical object. The even spacing of the touch sensor branches 34 provides even spacing between capacitive measurement nodes 38 shown as dots on the touch sensor branches.

The central spine 32 may contain a main buss electrical connection distribution leading to individual touch sensor branches 34 with the capacitive measurement nodes positioned at regular intervals. When the planar touch sensor 30 is formed into the final shaped touch sensor 36, it may conform to that shape without overlap or creases.

A naming convention may be selected by observing that each arm of the touch sensor branches 34 may be described as a row 40 of capacitive measurement nodes 38 of the touch sensors 30, 36. Consequently, the different touch sensor branches 34 thus form columns 42 of capacitive measurement nodes 38 of the touch sensors 30, 36.

Figure 2B:
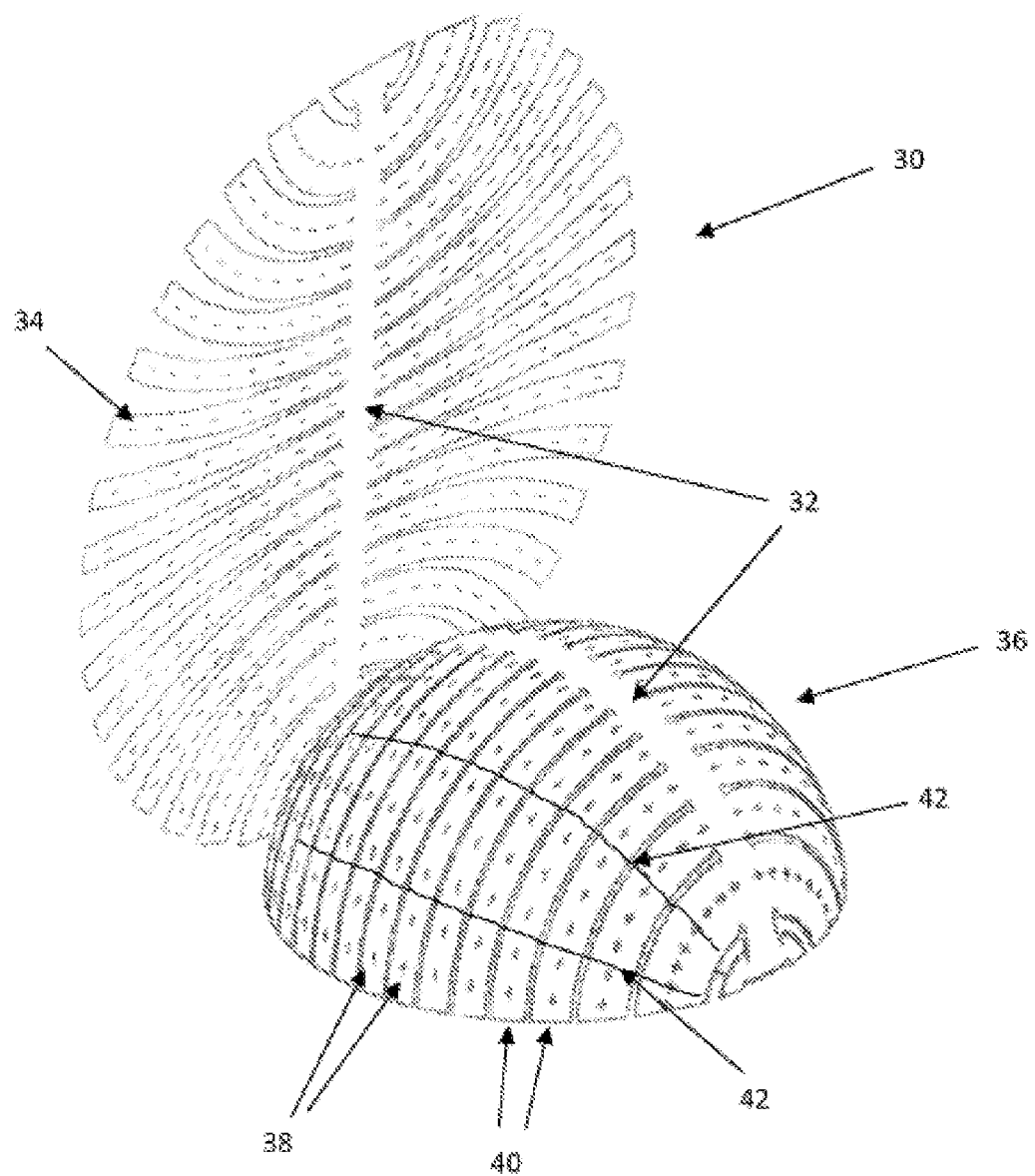
FIG. 2B depicts an example of two views of a first embodiment of the present disclosure, with the column and rows illustrated.

FIG. 2B is provided to illustrate two columns 42 of capacitive measurement nodes 38 on the touch sensor branches 34 with the columns drawn through the capacitive measurement nodes to illustrate their location. One aspect of the first embodiment is that the spacing between the rows 40 remains constant, but the spacing between the columns 42 does not. The columns 42 are arranged like longitudinal lines on a globe, where the ends of the longitudinal lines get closer near the ends, and farthest apart in the middle of the lines. However, the columns 42 may be linear despite the curvature of the hemispherical object under the shaped touch sensor 36.

The same detection and tracking algorithms of the configuration depicted in FIG. 1 may be reused with the embodiments depicted below and may provide significant development cost savings. In other words, if a different touch sensor detection and tracking algorithm had to be used for each three dimensional shape, the cost of making a touch sensor for each three-dimensional shape would be prohibitive.

Thus, one aspect of the first embodiment may be that the construction of the shaped touch sensor 36 may have the desired linearity in rows 40 and columns 42 only after it is disposed onto the surface of the three-dimensional object that it is constructed to fit. Consequently, existing detection and tracking touch sensor algorithms for planar touch sensors may be used without substantial modification.

In this document, the phrase "without substantial modification" for the detection and tracking touch sensor algorithms may be defined as only having to provide offsets in the detection and tracking algorithms to compensate for the uneven spacing between capacitive measurement nodes 38 in the rows 40, and not for the fact that the columns 42 and rows are substantially linear.

Figure 3:
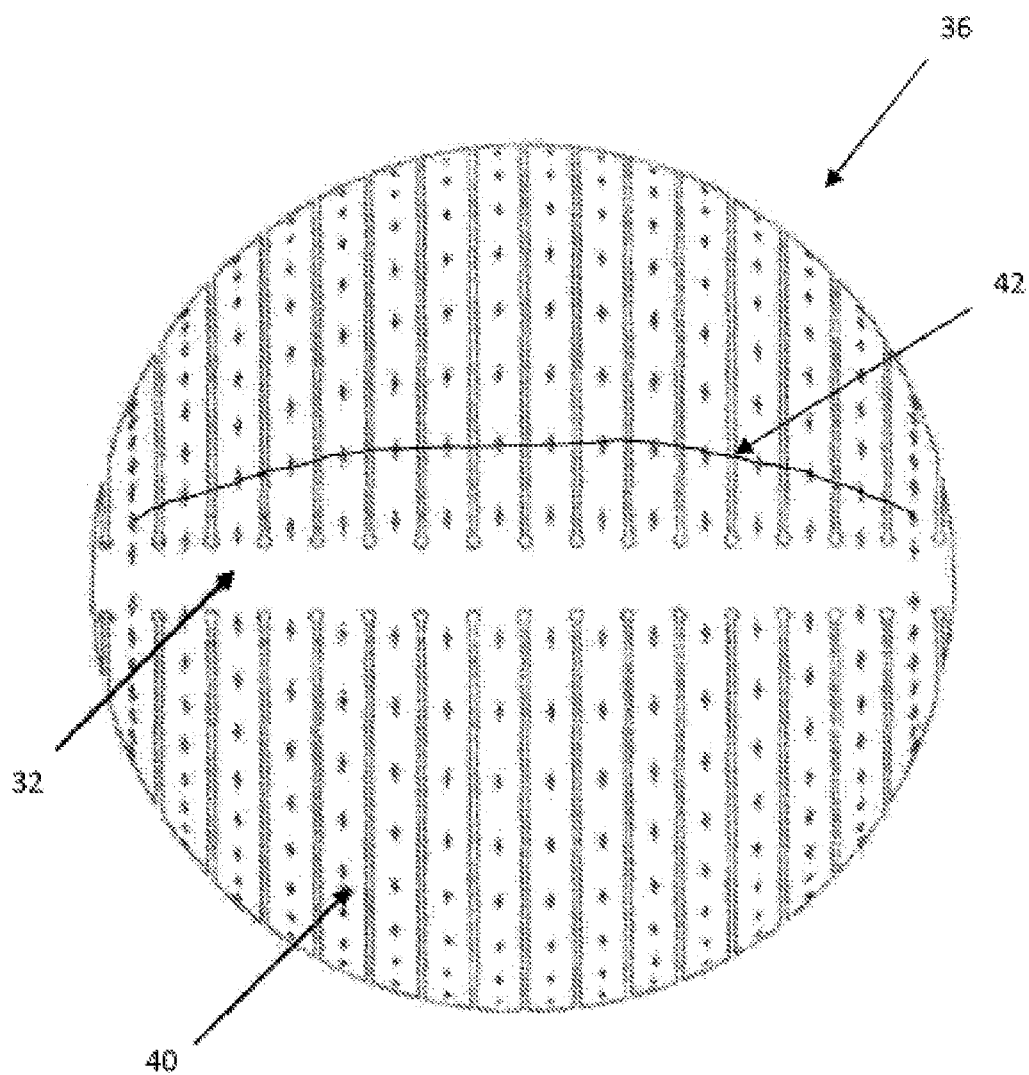
FIG. 3 depicts an example of an embodiment of the present disclosure.

FIG. 3 is a top view of the shaped touch sensor 36. This view shows the central spine 32 and also makes it easier to see the even spacing of the rows 40 and the arcuate nature of the columns 42.

Figure 4:
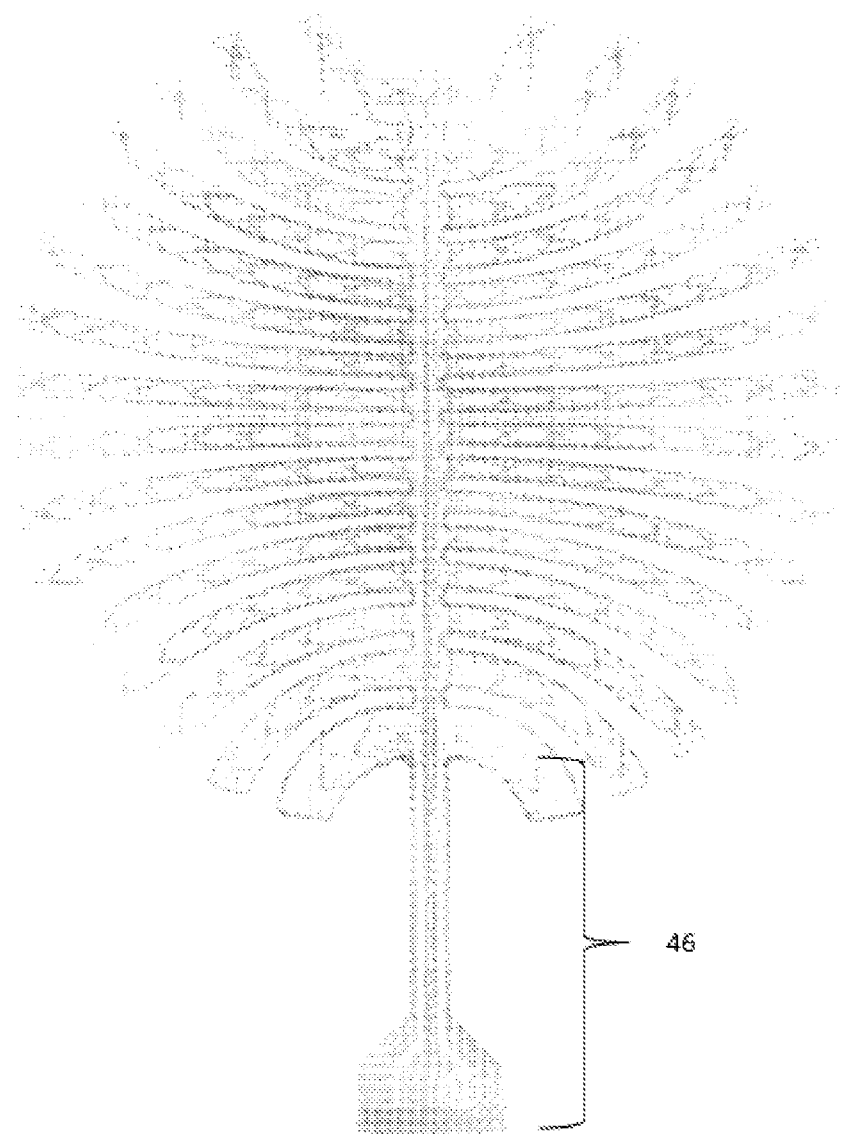
FIG. 4 depicts an example of an embodiment of the present disclosure showing a tail connector.

FIG. 4 is a top view of the planar touch sensor 30 of the first embodiment. However, a tail connector 46 is now shown as coupled to the planar touch sensor 30. The tail connector is a connection point of all row and column electrodes to the planar touch sensor 30.

Figure 5:
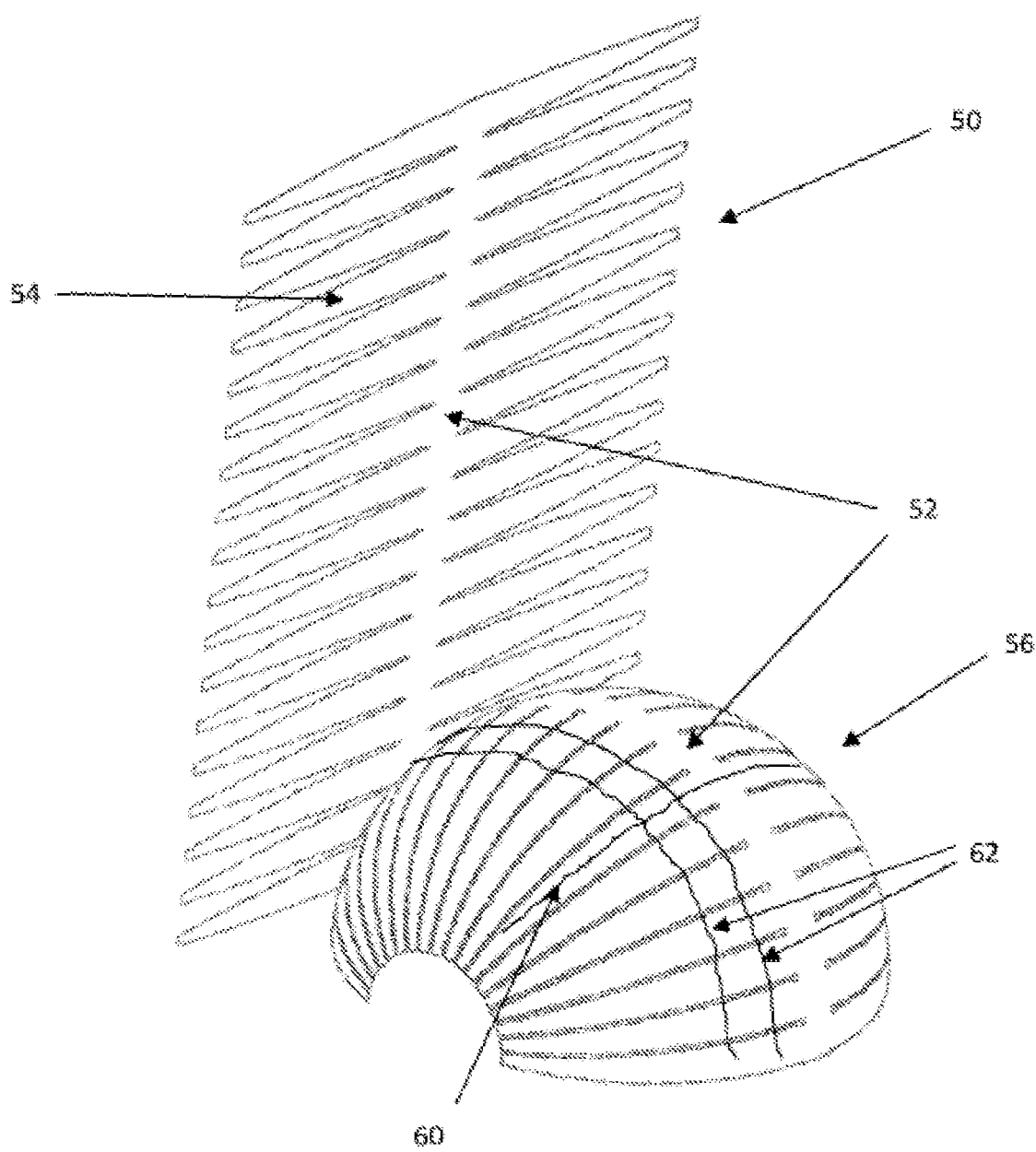
FIG. 5 depicts an example of a second embodiment of the present disclosure.

FIG. 5 is a perspective view of a second embodiment of the principles contained in this disclosure. Two images of the same touch sensor are shown in FIG. 5. The first image is a planar touch sensor 50 that is manufactured on a planar substrate. The second image is a shaped touch sensor 56 after it has been cut from the planar substrate and disposed over a three-dimensional object. In this case, the three-dimensional object is a hemispherical shape just as in FIGS. 2A and 2B, but other shapes may be used.

It should be understood that when the planar touch sensor 50 is cut from a substrate, the cut is made along the outline of the touch sensor. The cut must conform to the outline of the touch sensor branches 54 so that the touch sensor branches may be brought together when placed over the three-dimensional object. In some examples, the branches of the touch sensor may be formed through a removal process, such as cutting notches into the substrate material. However, in other examples, the shape of the touch sensor, including the branches, may be formed through an additive process.

The planar and shaped touch sensors 50, 56 include a central spine 52 and a plurality of touch sensor branches 54. One feature of the planar touch sensor 50 is that the touch sensor branches 54 are seen having a linear shape when shown in the planar configuration. However, unlike FIGS. 2A and 2B where the touch sensor branches 34 were of equal width but were all curved different amounts, the touch sensor branches 54 of FIG. 3 are narrow at the ends and widest at the middle and are of uniform shape. The shape of the touch sensor branches 54 may allow for the shaped touch sensor 56 to have the proper spacing between the touch sensor branches. It is noted that the spacing between the touch sensor branches 54 changes and the spacing is wider the further the touch sensor branches are from the central spine 52.

When the planar touch sensor 50 is bent so as to conform to the three-dimensional hemispherical object, the spacing between the touch sensor branches 54 is again changed as in the first embodiment. The shaped touch sensor 56 shows even spacing between the touch sensor branches 54 when disposed around the three-dimensional hemispherical object.

A naming convention may be selected by observing that each arm of the touch sensor branches 54 may be described as a row 60 of capacitive measurement nodes of the touch sensors 50, 56. Consequently, the different touch sensor branches 44 thus form columns 62 of capacitive measurement nodes of the touch sensors 50, 56.

However, it noted that instead of even spacing between all of the rows 40 and uneven spacing between the columns 42 as in the first embodiment, the rows 60 have uneven spacing and the columns 62 are evenly spaced in the second embodiment. Thus, capacitive measurement nodes in the second embodiment are unevenly spaced in the rows and evenly spaced in the columns.

Accordingly, one aspect of the second embodiment may be that the shape of the shaped touch sensor 56 may have the desired linearity in rows 60 and columns 62 only after it is disposed onto the surface of the three-dimensional hemispherical object that it is configured to fit. Consequently, existing detection and tracking touch sensor algorithms for planar touch sensors may be used without substantial modification.

In this document, the phrase "without substantial modification" for the second embodiment may be defined as only having to provide offsets in the detection and tracking algorithms to compensate for the uneven spacing between capacitive measurement nodes in the rows 60, and not for the fact that the rows and the columns 62 are substantially linear.

Figure 6:
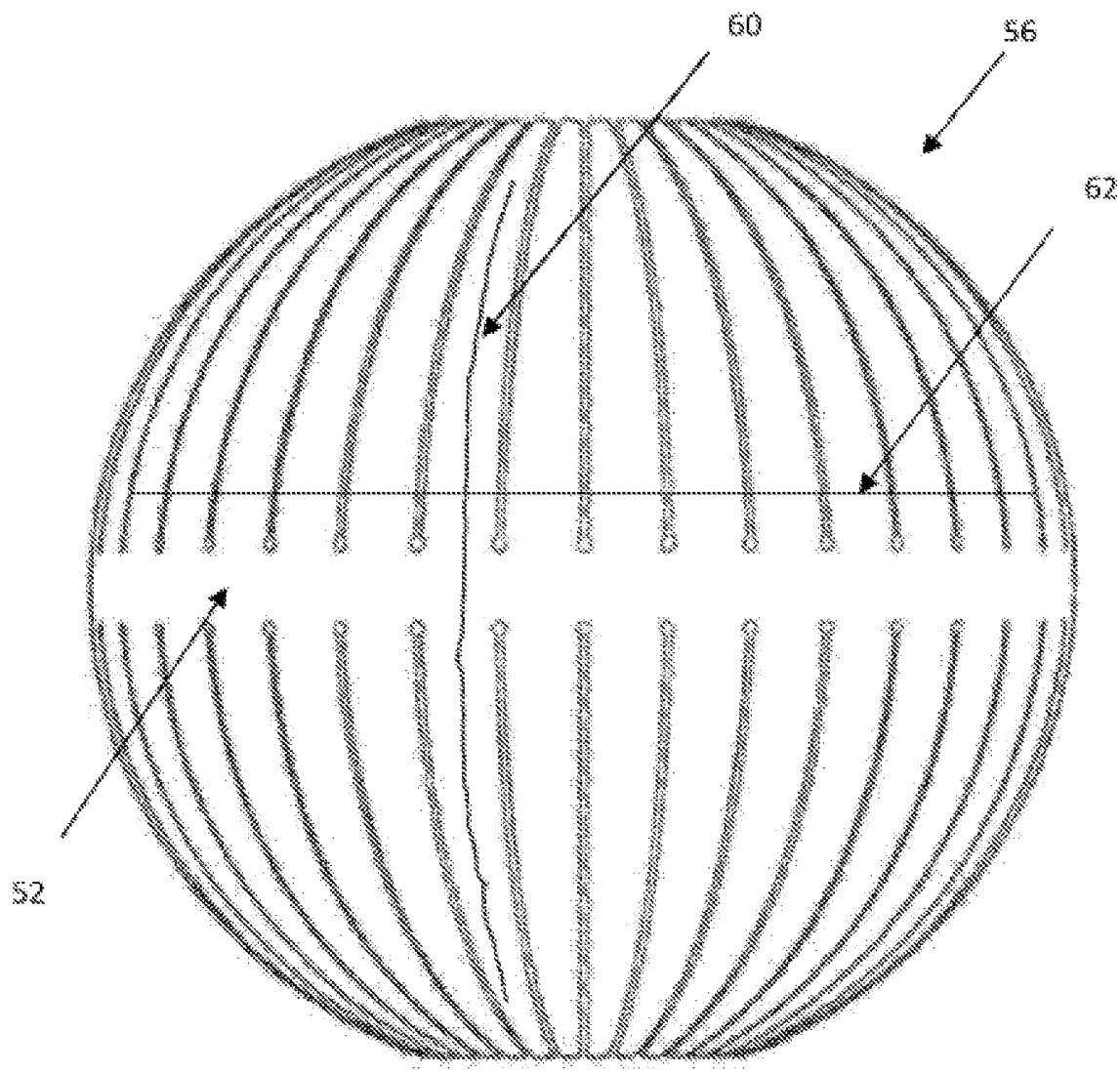
FIG. 6 depicts an example of an embodiment of the present disclosure.

FIG. 6 is a top view of the shaped touch sensor 56. This view shows the central spine 52 and also makes it easier to see the even spacing of the rows 60 and the arcuate nature of the columns 62.

Figure 7:
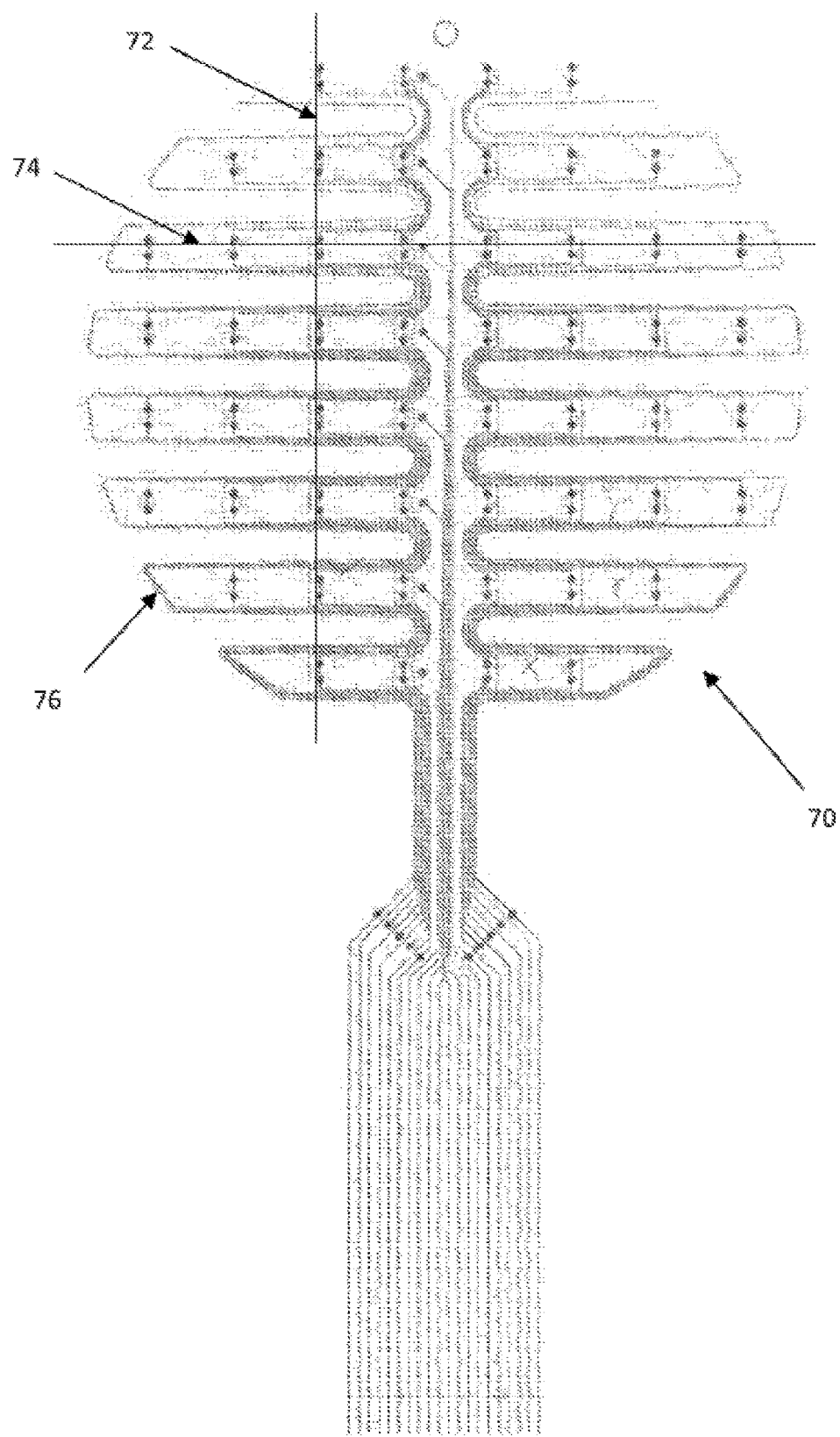
FIG. 7 depicts an example of an embodiment of the present disclosure.

FIG. 7 is a top view of a third embodiment of the present disclosure. In this third embodiment, a planar touch sensor 70 is shown from a top view. There are several differences between the planar touch sensor 70 of the third embodiment and the planar touch sensors 30, 50 of the first and second embodiments.

First, both columns 72 and rows 74 are evenly spaced in the planar configuration and in a shaped configuration when the planar touch sensor 70 is disposed around a three-dimensional object. Second, the spacing between the touch sensor branches 76 is much wider than the first or second embodiments. Third, the number of capacitive measurement nodes in the columns 72 and the rows 74 is no longer constant.

The result is that if the planar touch sensor 70 is disposed on a three-dimensional hemispherical object, the columns 72 and rows 74 may both remain evenly spaced, and the spacing between the rows 74 may remain constant. Accordingly, no offsets need to be used for the third embodiment, and the detection and tracking algorithms are absolutely unmodified.

The new embodiments may not be limited to a single axis curved surface application. Individual sensor elements may also be connected to a common control circuit or cable buss connection and distributed to a common control circuit.

At least some of the embodiments of the present disclosure may include a combination of relief apertures, cuts, tabbed sensor elements or slots in the planar and shaped touch sensors that may bend, fold and move such that when a planar touch sensor is applied to a three-dimensional surface, object detection and tracking remain achievable. Separate physical zones may be connected through wires, cables or flex circuit elements. Separate physical zones may also be adjacent to each other and allow a continuous flexible sensor to be bent and connected from one surface to another.

Figure 8:
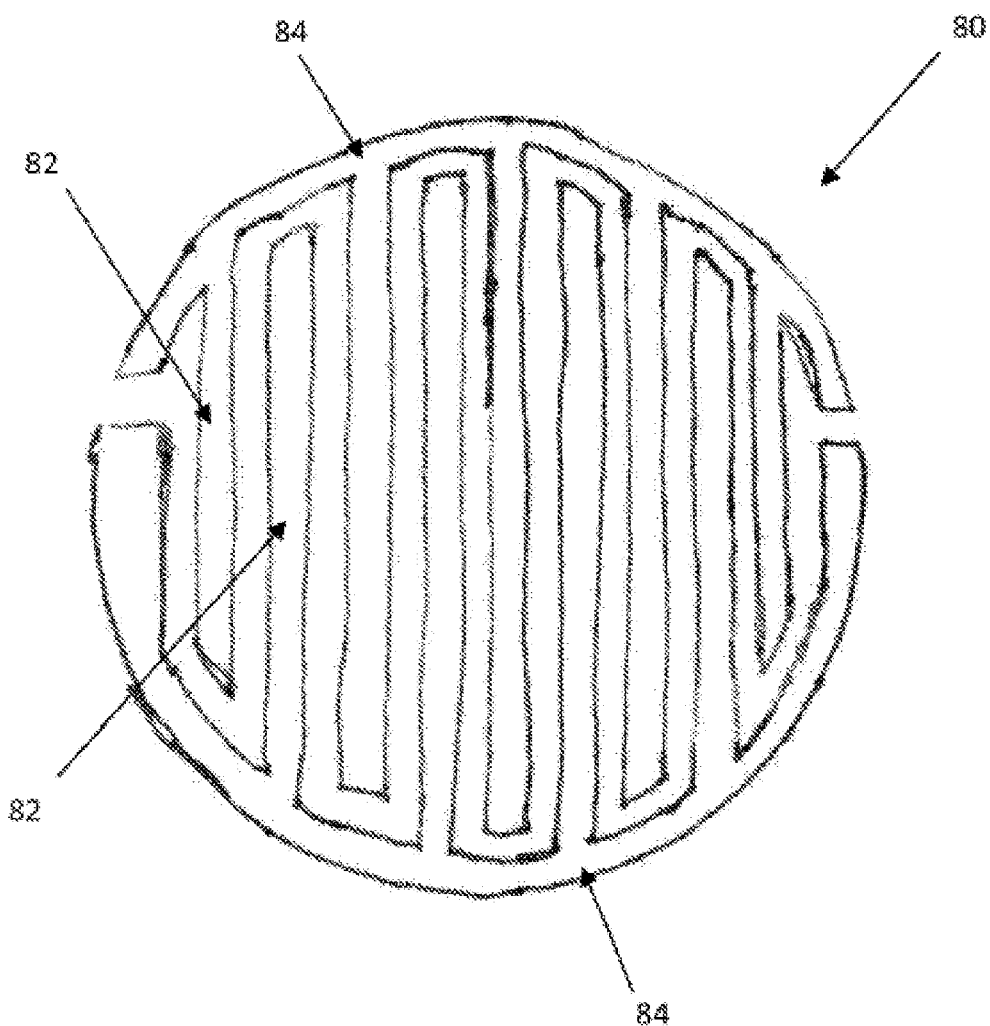
FIG. 8 depicts an example of an embodiment of the present disclosure.

FIG. 8 is a fourth embodiment. Instead of a central spine, this fourth embodiment may use an opposite approach. FIG. 8 is a top view of a shaped touch sensor 80 that is disposed on a three-dimensional object. The shaped touch sensor 80 may include a plurality of interlocking fingers 82 that may reach towards each other without making contact. This fourth embodiment may be constructed similar to the planar touch sensor 70 in FIG. 7, or like the planar touch sensors 30, 50, with a spine 84 on opposite sides of each other.

Figure 9:
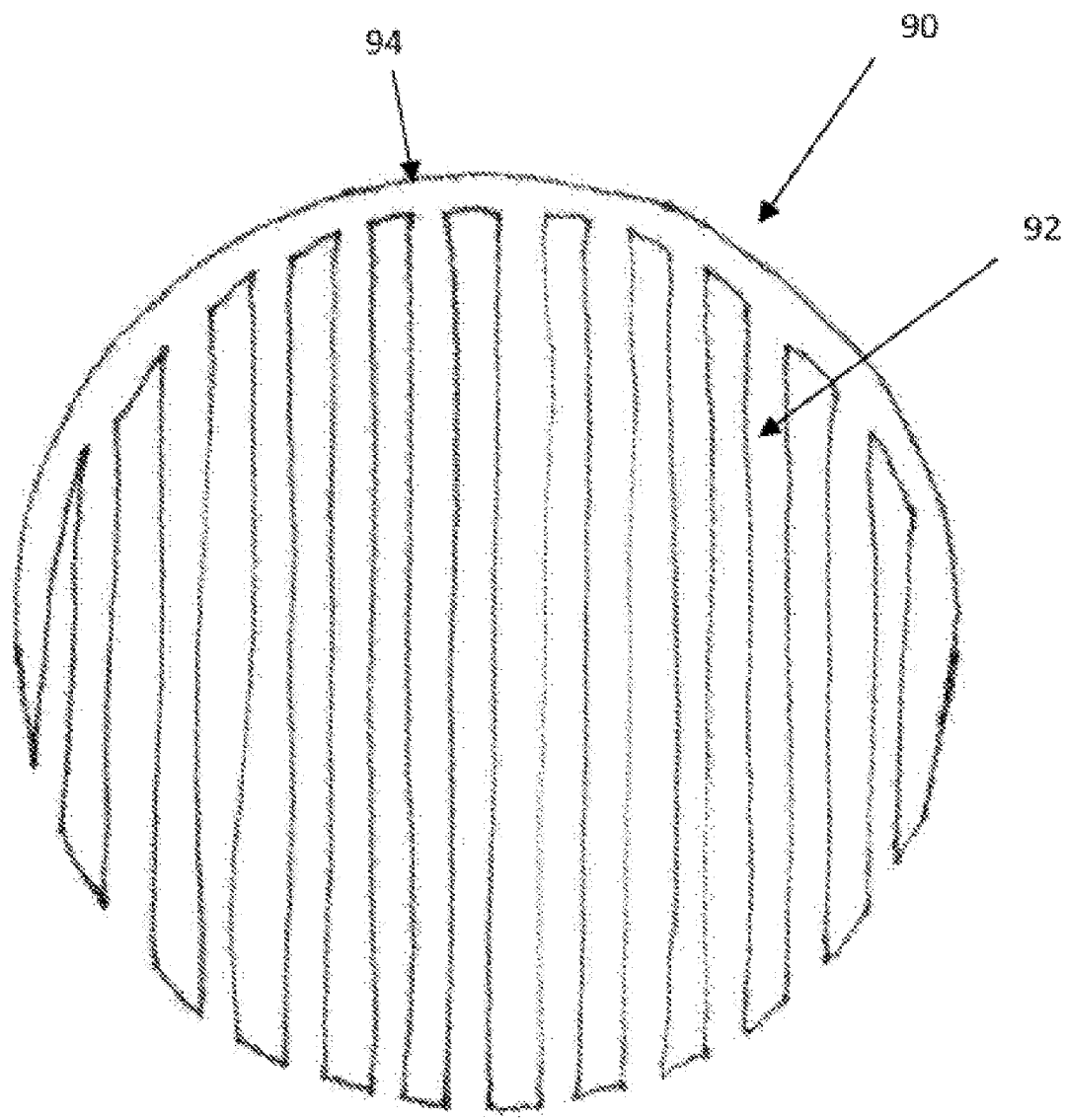
FIG. 9 depicts an example of an embodiment of the present disclosure.

FIG. 9 is a fifth embodiment. Instead of a central spine, this fifth embodiment may have a spine on one side only of the touch sensor. FIG. 9 is a top view of a shaped touch sensor 90 that is disposed on a three-dimensional object. The shaped touch sensor 90 may include a plurality of fingers 92 that may reach towards the far side of the three-dimensional object and extending from a single spine 94. This fifth embodiment may be constructed similar to the planar touch sensor 70 in FIG. 7, or like the planar touch sensors 30, 50, with a spine 94 on just one side.

Figure 10:
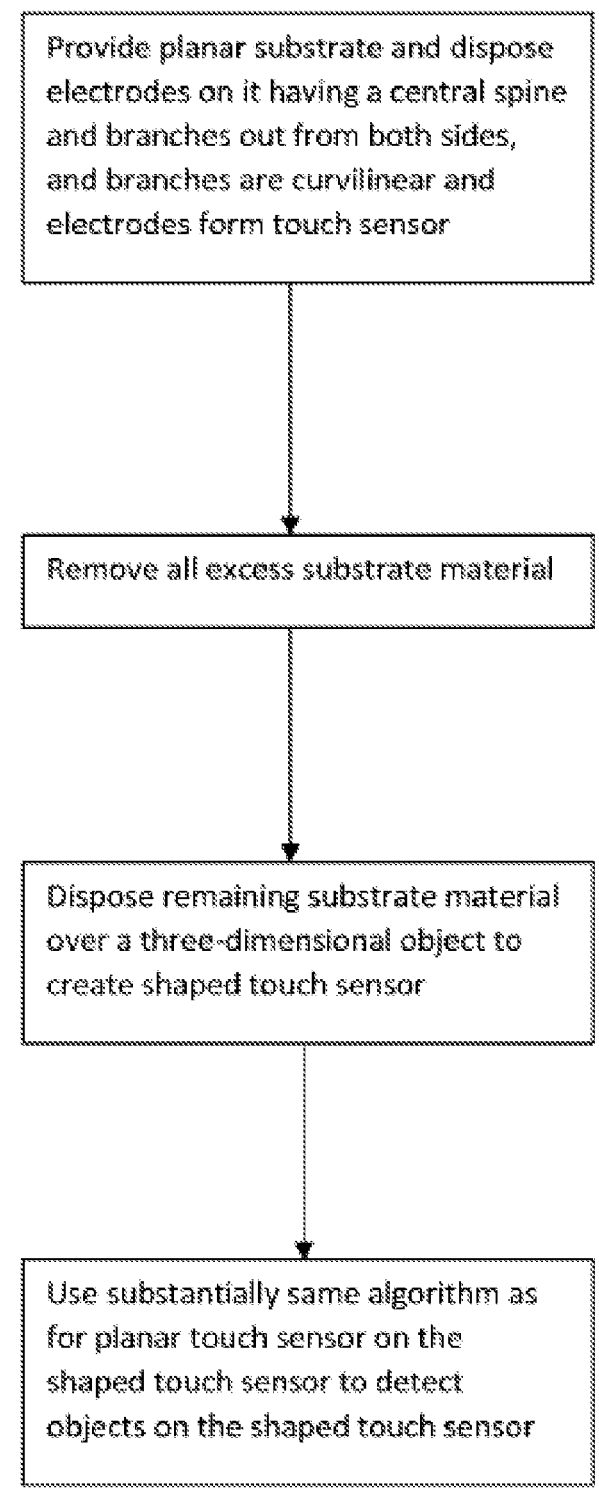
FIG. 10 depicts an example of a method of a first embodiment of the disclosure.

FIG. 10 depicts an example of a flowchart that illustrates a method for operating a three-dimensional touch sensor. The method may include providing a planar substrate material, disposing a plurality of electrodes on a first portion of the planar substrate material, wherein the first portion may include a central linear spine, wherein a plurality of touch sensor branches may extend away from the central linear spine in opposite directions, wherein the touch sensor branches are curvilinear, and wherein the plurality of electrodes may form a touch sensor.

The method may also include removing a second portion of the planar substrate material that does not contain any of the first portion. Then the first portion of the planar substrate material is disposed over a three-dimensional object such that the first portion conforms to a surface of the three-dimensional object such that there are no gaps through the first portion and the first portion forms the touch sensor having a plurality of columns and rows.

The embodiments may use offset voltages to have substantially the same detection and tracking algorithm as used on a planar touch sensor, the algorithm may detect and/or track one or more objects on the first portion of the planar substrate material.

The method may also include forming a plurality of capacitance sensing nodes on the first portion of the planar substrate material, wherein the capacitance sensing nodes may be formed wherever the plurality of electrodes cross over each other to form the columns and the rows.

The capacitance sensing nodes may be spaced equidistantly on each of the rows, but different rows may have different spacing between the capacitance sensing nodes on each row.

The method may also include providing offsets in the detection and tracking algorithm to compensate for the different spacing between the capacitance sensing nodes.

It is noted that although the embodiments may enable the use of detection and tracking algorithm that is substantially unchanged from that used by a planar touch sensor, it may also be modified in order to achieve certain levels of performance.

Figure 11:
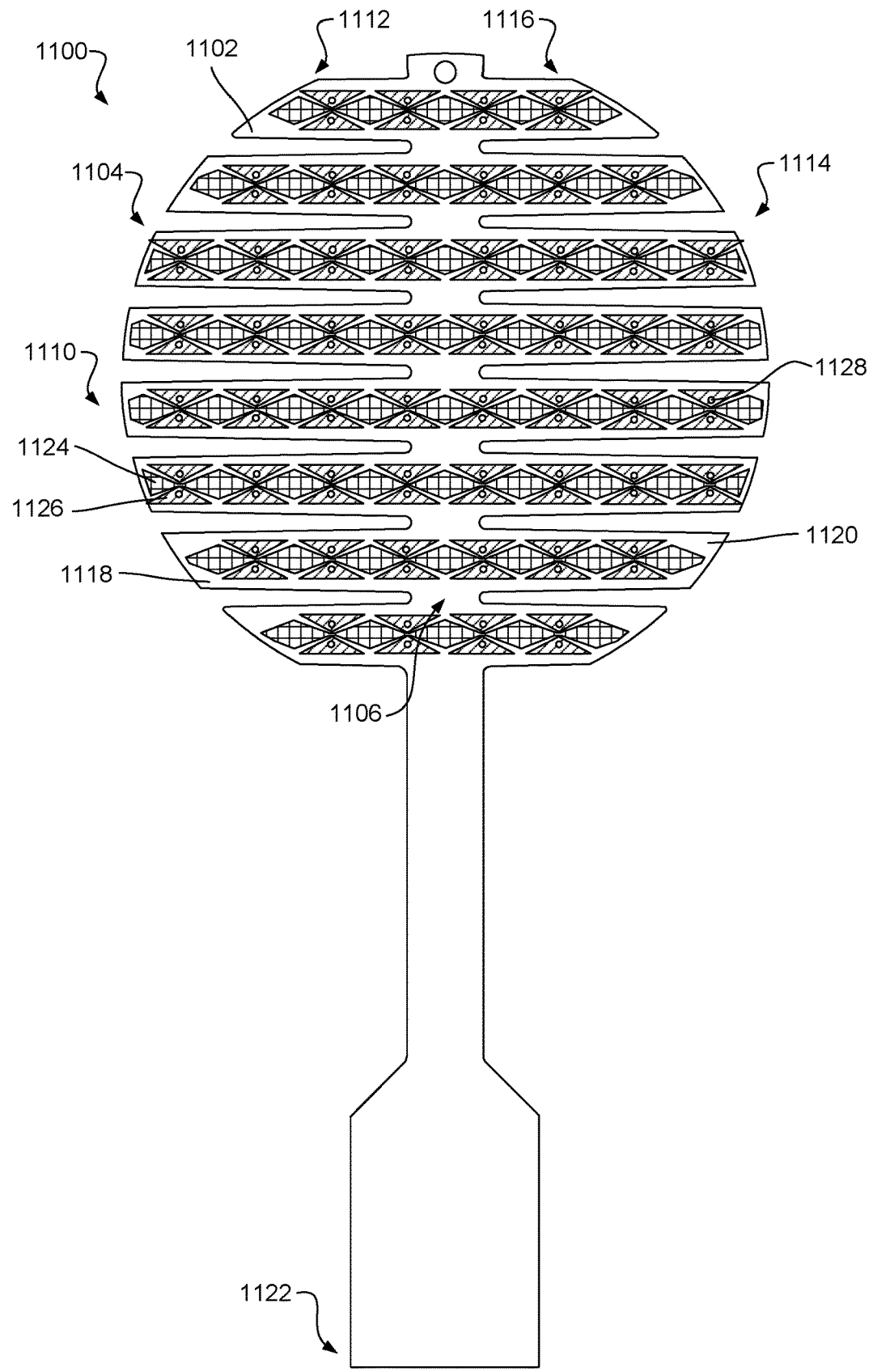
FIG. 11 depicts an example of a touch sensor according to the present disclosure.

FIG. 11 depicts an example of a touch sensor 1100. In this example, the substrate material 1102 includes a shape 1104 having a continuous section 1106 and multiple branches extending away from the continuous portion 1106. In this example, a first set 1110 of multiple branches extend away from the continuous section 1106 and are connected on a first side 1112 of the continuous section 1106, and a second set 1114 of multiple branches extend away from the continuous section 1106 and are connected on a second side 1116 of the continuous section 1106. In this example, the first set 1114 and the second set 1116 of branches are aligned with each other and extend in opposite directions. However, in alternative examples, all the branches may extend in the same direction. In yet other examples, the branches may extend in more directions than just two opposite directions. In the illustrated example, the branches are aligned in pairs where a first branch 1118 and a second branch 1120 are connected to the continuous portion at approximately the same distance from an end 1122 of the continuous section 1106.

For illustrative purposes, the electrodes from a first layer and a second layer of the touch sensor 1100 are depicted side by side in the example of FIG. 11. However, the first layer and the second layer may be separated by the substrate material. Separating the first layer of electrodes from the second layer of electrodes prevents the electrodes on the different layers from shorting to each other.

In some examples, the continuous electrodes 1124 are located on a first layer and the segmented electrodes 1126 are located on a second layer, where the first and second layers are separated from each by a substrate. The continuous electrodes 1124 and the segmented electrodes 1126 may form a combination of rows and columns in a capacitance sensor gird. In the illustrated example of FIG. 11, a continuous electrically conductive material including a series of diamond shapes constitutes the continuous electrode. Also illustrated in FIG. 11 is a series of triangular shapes of electrically conductive material that form segmented columns. In this example, the segmented column of triangular deposits constitutes the segmented electrode. The circles depicted in FIG. 11 depict vias 1128 that electrically interconnect the segmented electrode to a series of traces on a different layer that is electrically shielded from the electrode layers. The series of traces may electrically connect the segments of the same segmented electrode together. In some examples, these traces allow the segmented electrode to function as a single electrode.

Figure 12:
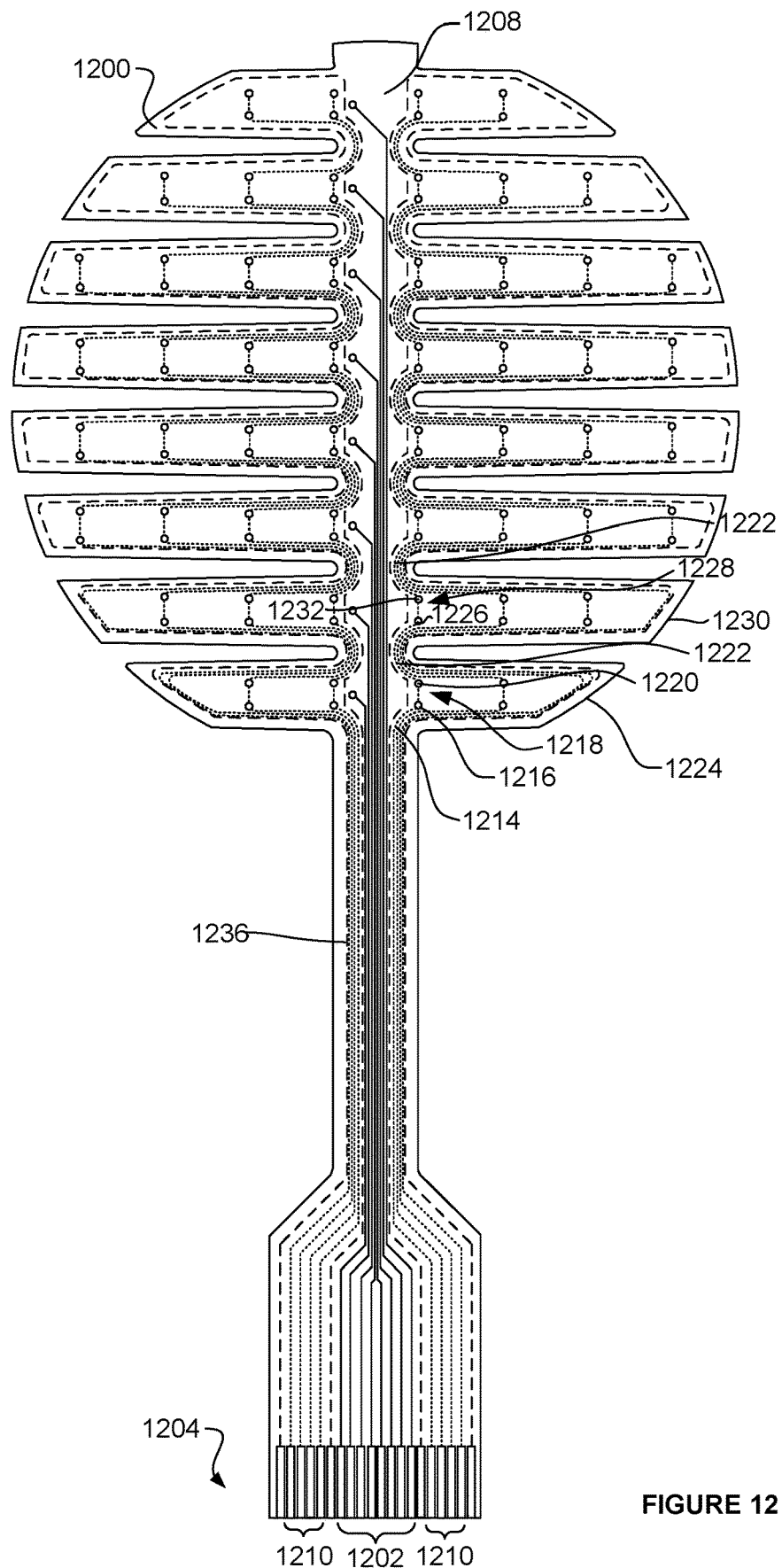
FIG. 12 depicts an example of a touch sensor according to the present disclosure.

FIG. 12 depicts an example of the traces on the shield layer 1200 of the touch sensor. In this example, a first set 1202 traces connect an electrical terminal 1204 to the continuous electrodes. The first set 1202 of electrodes are deposited just along the continuous section 1206 of the substrate material. Each of these traces connects to a single via 1208 that is also located in the continuous section that ports the trace to the continuous electrode on its respective layer. In other examples, the vias to the continuous electrode may be located in one of the branches.

Also in this example, a second set 1210 of traces connects the electrical terminal 1204 to the different segments of the segmented electrode. Each of the traces in the second set 1210 connect to multiple vias to port the respective traces to each of the segments of the segmented electrodes. In this example, multiple pairs of vias are spaced apart from the continuous section at different spaces. In this arrangement, a first trace segment 1214 connects to a first via 1216 of a first pair 1218. This first via 1216 connects the first trace segment 1214 to the first segment of the segmented electrode. The second via 1220 of the first pair 1218 connects the first segment of the segmented electrode to a second trace segment 1222 on the layer depicted in FIG. 12. This first pair 1218 is located on the first branch 1224. Each of the trace segments are routed in both the branches and in the continuous section 1206. By routing the trace segments through the continuous section 1206 the vias on different branches can be connected.

The second trace segment 1222 connects to a first via 1226 of a second pair 1228 on the second branch 1230. This via 1226 connects to a second segment of the segmented electrode on the respective layer. The second via 1232 of the second pair 1228 connects the segment to a third trace segment 1234. This pattern is repeated until the last pair 1236 of vias on this column is connected. The trace and via configuration is repeated on the other side of the continuous section 1206.

In the example depicted in FIG. 12, some of the branches have different lengths than other. In this example, the longer branches include more columns. For example, as depicted in FIG. 12, the medial most branches include four columns, while the distal most branches include just two columns each.

Also, in this example, a ground electrode 1236 is deposited on both the branches and on the continuous section. In some cases, the ground electrode 1236 may provide a return path for the traces.

Figure 13:
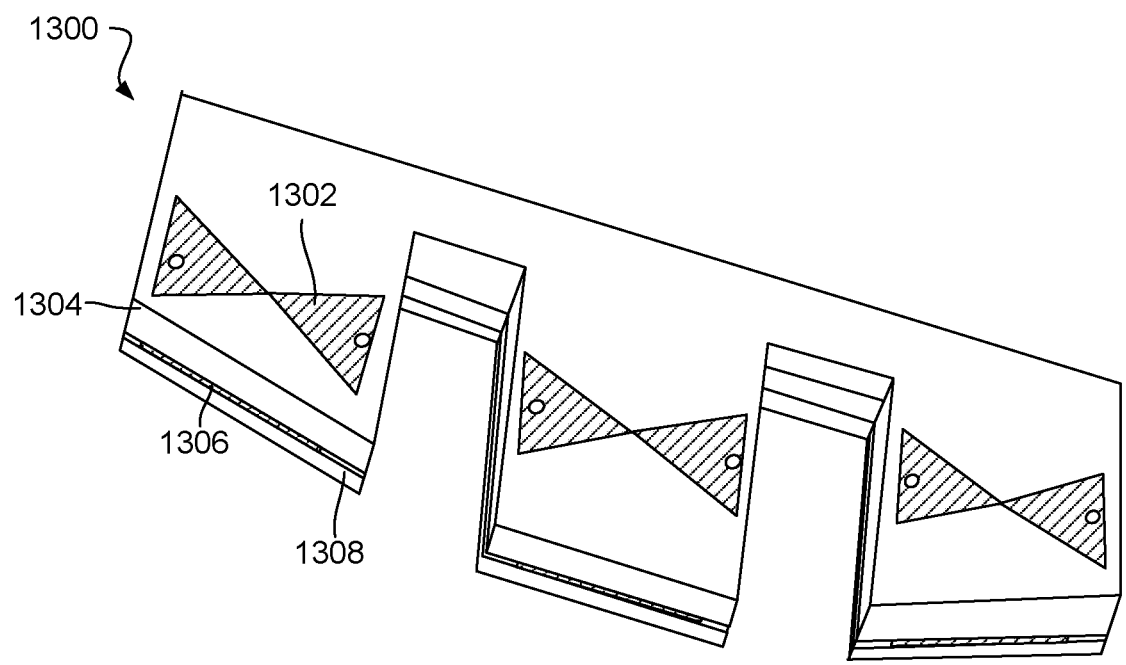
FIG. 13 depicts an example of a touch sensor according to the present disclosure.
Figure 14:
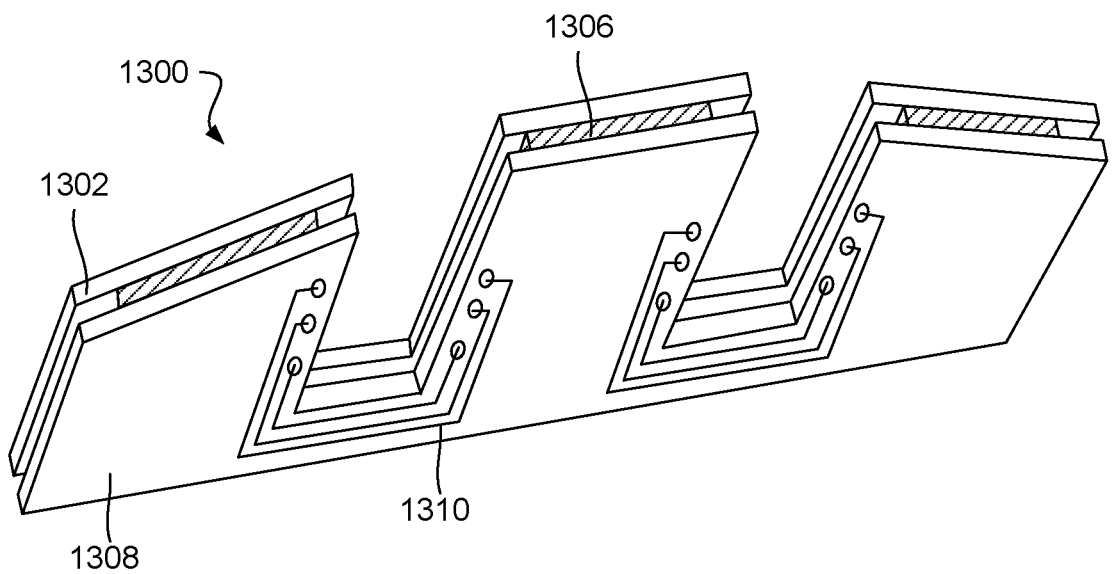
FIG. 14 depicts an example of a touch sensor according to the present disclosure.

FIGS. 13 and 14 depict different layers of the touch sensor 1300. In these examples, the top layer is a deposit of electrically conductive material forming the segmented electrode 1302. The second layer is the substrate 1304. In some cases, the substrate is a printed circuit board, but any appropriate type of material may be used in accordance with the principles contained in this disclosure. The third layer is another deposit of electrically conductive material forming the continuous electrode 1306. The fourth layer is a shield 1308 that blocks electrical interference. The fifth layer includes deposits of electrically conductive material making the traces 1310. While this example depicts the segmented electrode as the first layer and the continuous layer as the third layer, in other embodiments, these layers are switched.

The layers may be electrically interconnected at select locations through vias or other routing mechanism. For example, vias may connect the traces 1310 behind the shield 1308 with either the continuous electrode 1306 and/or the segmented electrode 1302.

Figure 15:
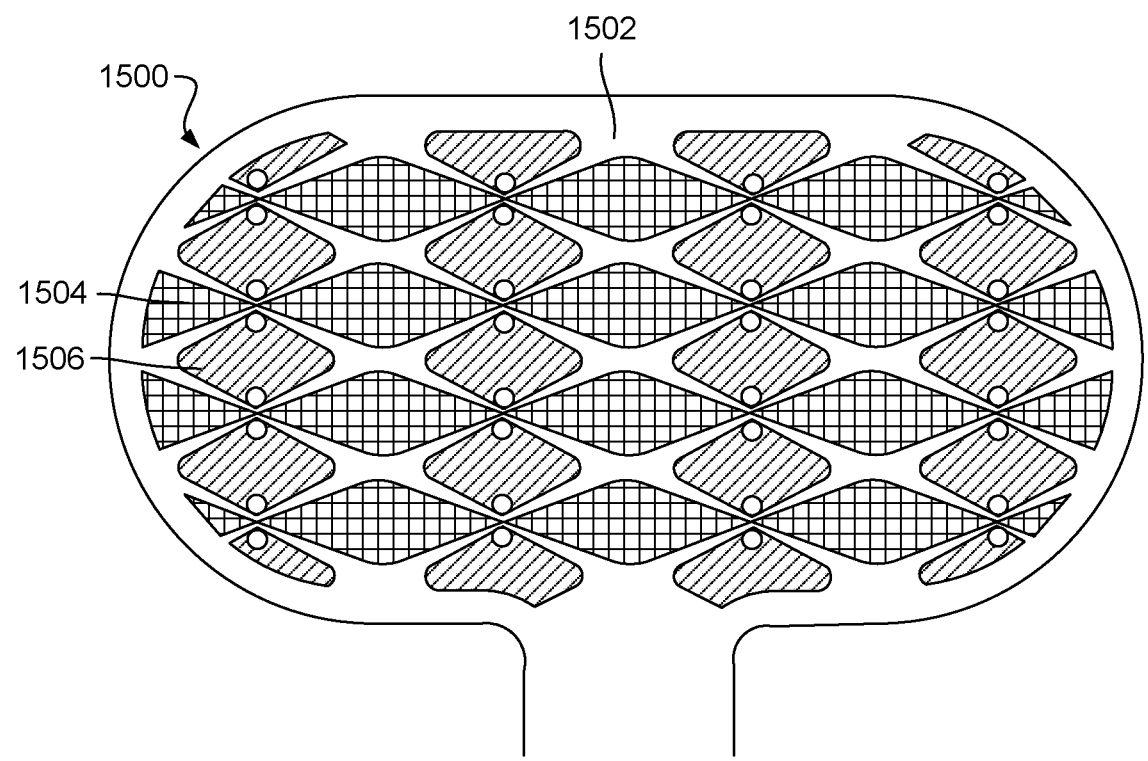
FIG. 15 depicts an example of a touch sensor according to the present disclosure.
Figure 16:
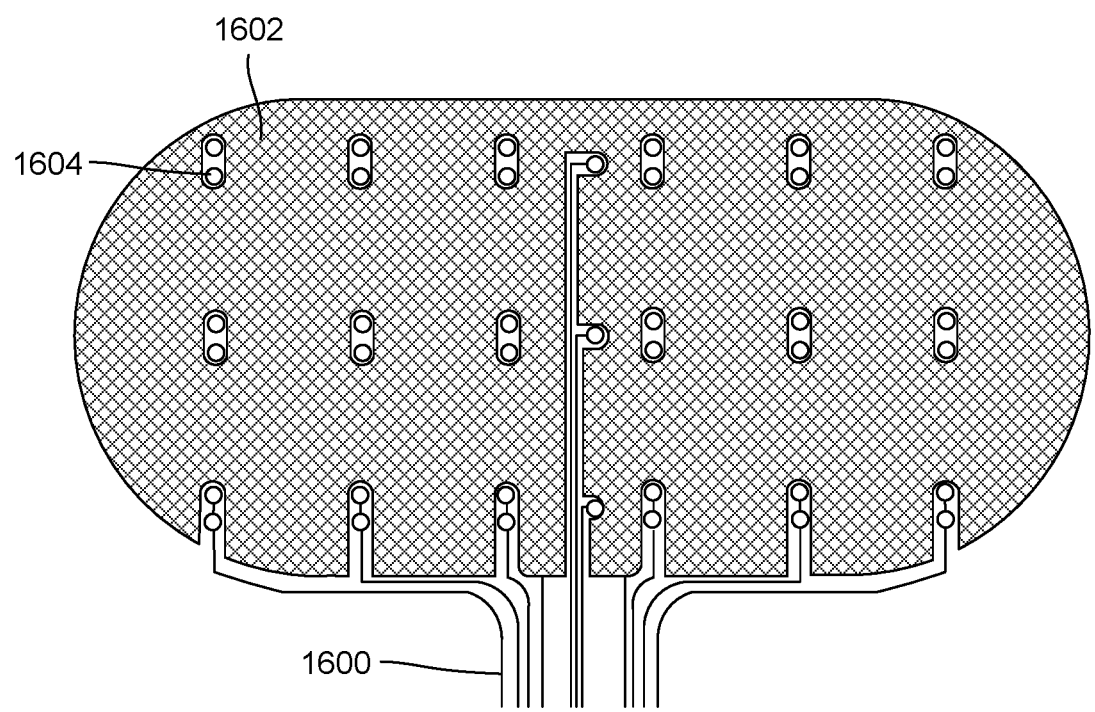
FIG. 16 depicts an example of a touch sensor according to the present disclosure.

FIGS. 15 and 16 depict another example of a touch sensor 1500. In this example, the substrate material 1502 does not include branches that extend from a continuous section and that are spaced apart from each other with a distance when the substrate material is flat. The shape of this substrate material 1502 is oblong, but any appropriate shape may be used. A continuous electrode 1504 is deposited on a first side of the substrate material 1502, and a segmented electrode 1506 is deposited on a second side of the substrate material 1502. However, in the example of FIG. 15, the continuous electrode 1504 and the segmented electrode 1506 are depicted superimposed over each other for purposes of illustration. Traces 1600 are routed through a shield 1602 through vias 1604 to connect the segments of the segmented electrode 1506 while preventing the traces 1600 from electrically interfering with the capacitance readings of the electrodes 1504, 1506.

Figure 17:
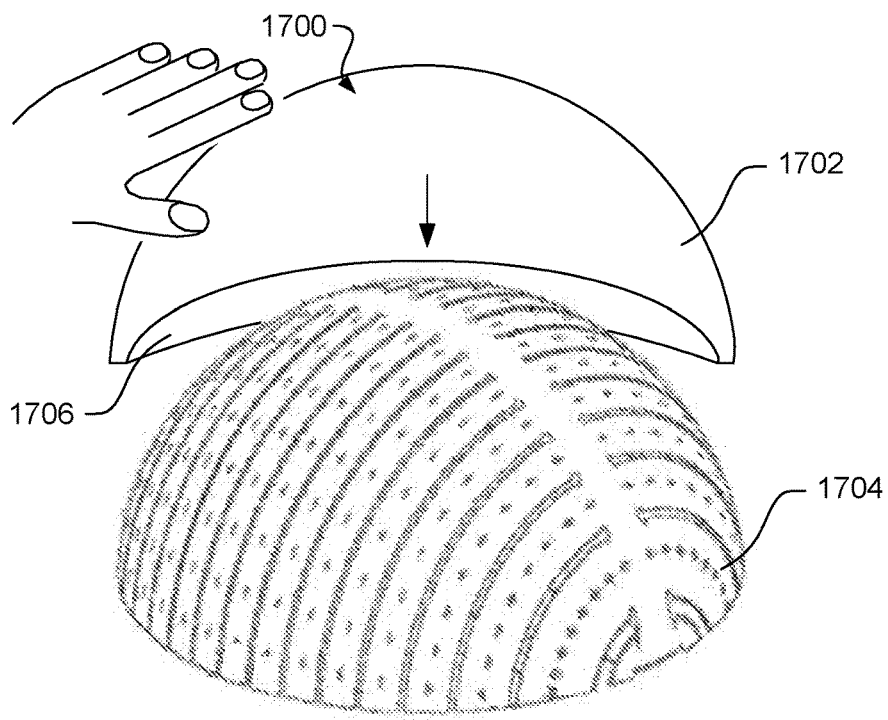
FIG. 17 depicts an example of a touch surface according to the present disclosure.

In the examples of FIGS. 11 and 12, the substrate material is depicted flat. In some examples, the touch sensor may be made flat and be made of materials flexible enough to bend to conform to the profile of another shape. In the example of FIG. 17, the touch sensor additionally includes a touch surface 1700, which is configured for a user to touch on a touch side 1702. The substrate material 1704 is bent to conform the back side 1706 of the touch surface 1700. In this example, the touch surface 1700 is a multi-axis shape, such as a hemispherical shape, but other shapes may be used. With the substrate material 1704 disposed adjacent to and conforming to the profile of the back side 1706 of the touch surface 1700, the electrodes on the substrate material 1704 can depict capacitance changes resulting from the physical presence of a user's hand.

The touch surface 1700 may be incorporated into the exterior of an input device. For example, the input device may be a gaming controller, and the touch surface 1700 may be a button, a knob, a bump, a flat surface, another type of surface that the user can touch to provide an input to the electrodes on the substrate material 1704. The touch surface 1704 may be made of any appropriate type of material. In some cases, the touch surface 1704 is electrically insulating, such as a plastic.

Figure 18:
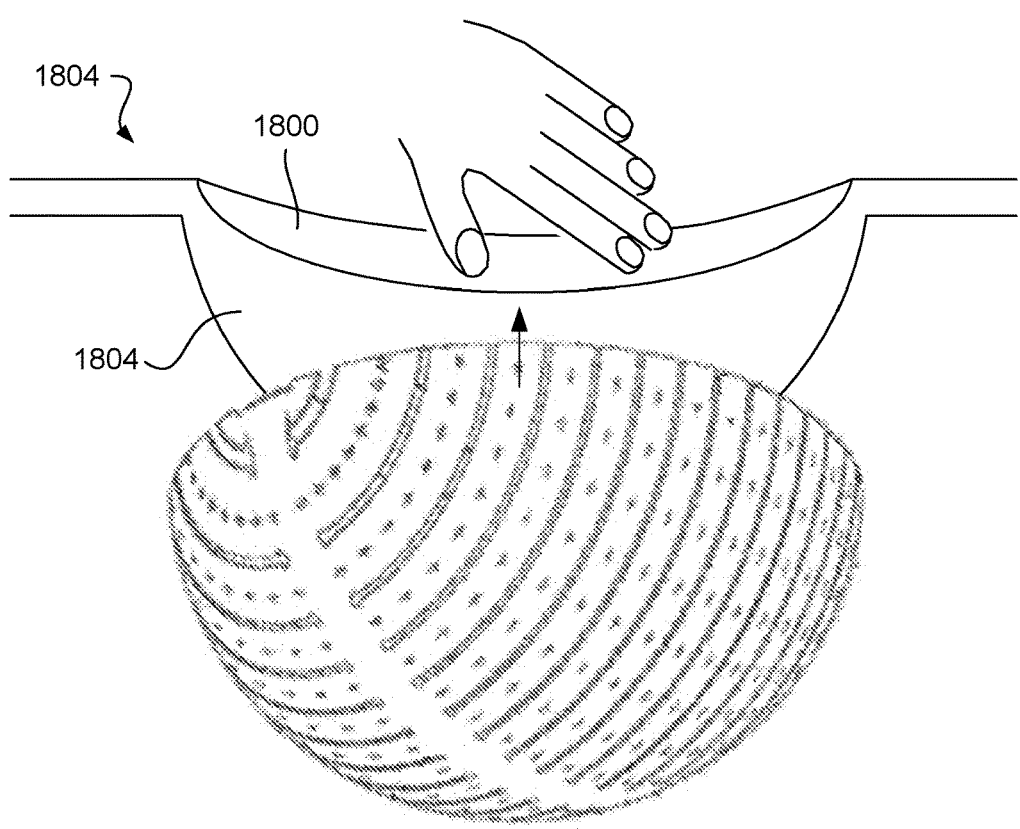
FIG. 18 depicts an example of a touch surface according to the present disclosure.

In the example of FIG. 17, the back side 1706 of the touch surface 1700 forms a concave shape, and the substrate material 1704 is bent to conform to the concave profile. In this example, the touch side 1702 of the touch surface 1700 has a convex shape. In the example of FIG. 18, the back side 1800 of the touch surface 1802 has a convex shape, and the touch side 1804 of the touch surface 1802 is concave.

These components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A touch sensor, comprising:
   a substrate material;
   a continuous electrode arranged along a dimension of the substrate material;
   a segmented electrode transversely arranged with respect to the continuous electrode and wherein the segmented electrode is divided into multiple segments that are spaced apart at a distance from each other; and
   at least one trace that electrically connects the multiple segments;
   wherein the continuous electrode is deposited on a first branch connected on a first side of the continuous section and on a second branch connected on a second side of the continuous section, wherein the continuous electrode spans across the continuous section between the first branch and the second branch; wherein the continuous electrode is configured to take measurements along the width of the continuous section.

2. The touch sensor of claim 1, wherein a portion of the at least one trace is located on a shielded layer of the touch sensor that is electrically shielded from the layers containing the continuous electrode and segmented electrode.

3. The touch sensor of claim 1, wherein the substrate material includes multiple branches extending outwardly from a continuous section of the substrate material and at least one gap is formed between the branches when the substrate material is flat.

4. The touch sensor of claim 3, further comprising a three dimensional touch surface;
   wherein the substrate material is bent to conform with a profile of the back surface of the touch surface and positioned up against the profile.

5. The touch sensor of claim 4, wherein the three dimensional surface is a multi-axis surface.

6. The touch sensor of claim 4, wherein the branches come together when the substrate material is bent to conform with the profile and reduce the distance between the segments of the segmented electrode.

7. The touch sensor of claim 3, wherein the segments of the segmented electrode are deposited on a different branch.

8. The touch sensor of claim 7, wherein the segments of the segmented electrode are arranged in a line and form a column of a capacitance measuring grid when the touch sensor is bent to match and be secured against a curved surface.

9. The touch sensor of claim 8, wherein the continuous electrode forms a row in the capacitance measuring grid.

10. The touch sensor of claim 8, wherein the curved surface is part of a gaming controller.

11. The touch sensor of claim 1, further includes a shield, wherein the shield includes at least one opening through which the at least one trace is routed to connect the multiple segments.

12. The touch sensor of claim 11, wherein the trace is deposited on a portion of the branch and the continuous section.

13. The touch sensor of claim 1, wherein the at least one trace has a serpentine route between the branches and the continuous portion and also crosses back and forth between an electrode layer of the touch sensor and a shielded layer of the touch sensor.

14. A touch sensor, comprising:
    a substrate material;
    a shape of the substrate material comprising a continuous section and multiple branches;
    a continuous electrode arranged along a length of at least one of the branches;
    a segmented electrode transversely arranged with respect to the length of the at least one of the branches and arranged to cross over at least one gap formed between the branches of the substrate material causing the segmented electrode to be divided into multiple segments across multiple branches that are spaced apart at a distance from each other by the at least one gap; and
    at least one trace that electrically connects the multiple segments and that is routed through both the continuous section and the branches;
    wherein the continuous electrode is deposited across the continuous section;
    wherein the continuous electrode is configured to take measurements along the width of the continuous section.

15. The touch sensor of claim 14, wherein a portion of the at least one trace is located on a shielded layer of the touch sensor that is electrically shielded from the layers containing the continuous electrode and segmented electrode.

16. The touch sensor of claim 14, further comprising a three dimensional touch surface;
    wherein the substrate material is bent to conform with a profile of the back surface of the touch surface and position up against the profile.

17. The touch sensor of claim 16, wherein the three dimensional surface is a multi-axis surface.

18. The touch sensor of claim 16, wherein the branches come together when the substrate material is bent to conform with the profile and reduce the distance between the segments of the segmented electrode.

19. A touch sensor, comprising:
    a substrate material;
    a shape of the substrate material comprising a continuous section and multiple branches;
    a continuous electrode arranged along a length of at least one of the branches;
    a segmented electrode transversely arranged with respect to the length of the at least one of the branches causing the segmented electrode to be divided into multiple segments across multiple branches; and
    at least one trace that electrically connects the multiple segments and that is routed through both the continuous section and the branches;
    wherein the continuous electrode is deposited across the continuous section;
    wherein the continuous electrode is configured to take measurements along the width of the continuous section.

* * * * *